May 30, 1939.　　　　H. C. DRAKE　　　　2,160,540
METHOD OF FLAW DETECTION
Filed April 12, 1935　　　2 Sheets-Sheet 1
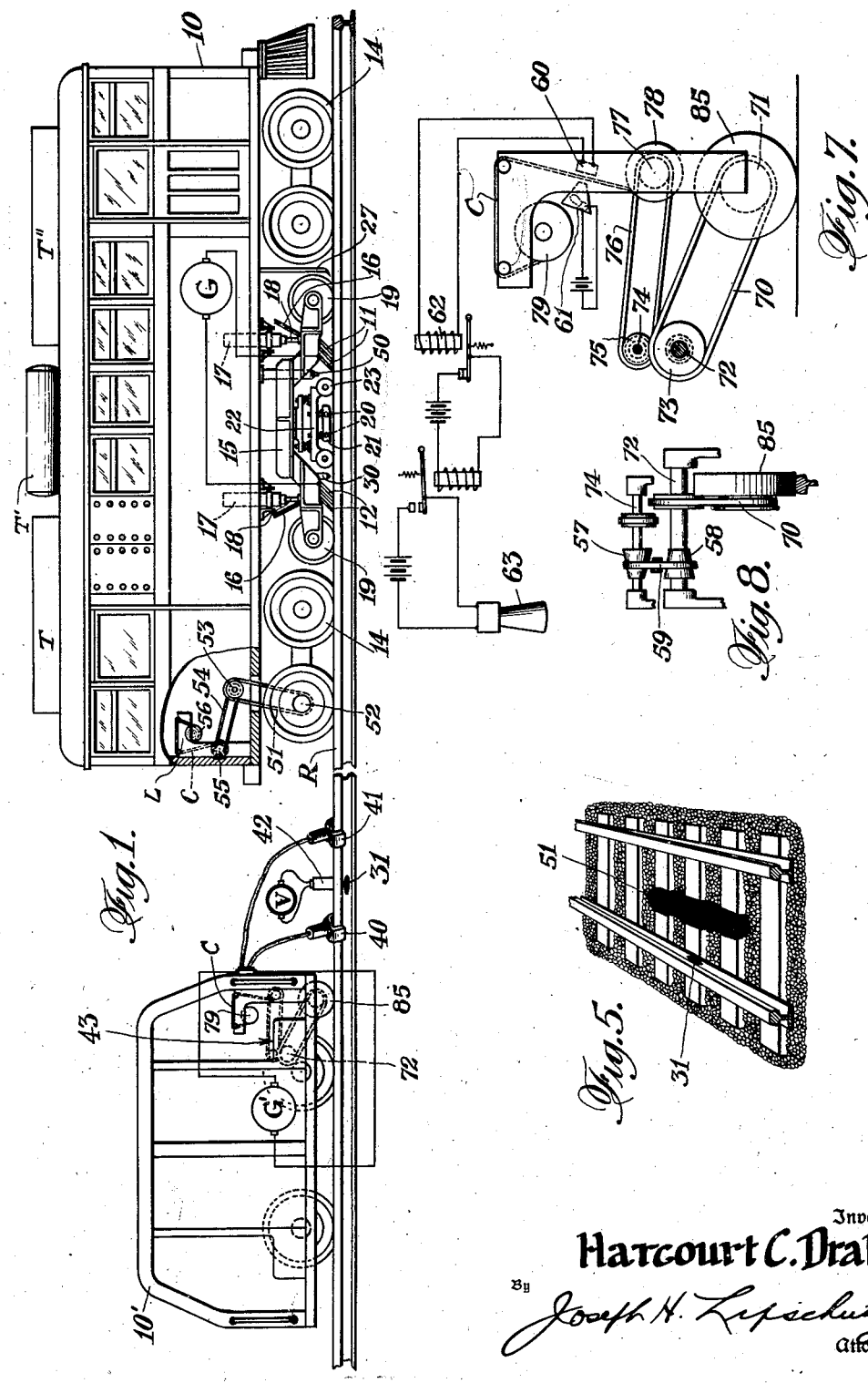
Inventor
Harcourt C. Drake
By Joseph H. Lipschutz
Attorney May 30, 1939.   H. C. DRAKE   2,160,540
METHOD OF FLAW DETECTION
Filed April 12, 1935   2 Sheets-Sheet 2

Inventor
Harcourt C. Drake
By Joseph H. Lipschutz
Attorney

Patented May 30, 1939

2,160,540

UNITED STATES PATENT OFFICE 2,160,540

METHOD OF FLAW DETECTION

Harcourt C. Drake, Hempstead, N. Y., assignor to Sperry Products, Inc., Brooklyn, N. Y., a corporation of New York Application April 12, 1935, Serial No. 15,946

5 Claims. (Cl. 175—183)

This invention relates to a method of and means for detecting flaws in electrical conductors and, more particularly, in rails in track. This application is a continuation in part of my copending application Serial No. 705,880 filed Jan. 9, 1934, which was a continuation in part of application Serial No. 698,970 filed Nov. 21, 1933. The present Sperry rail flaw detector car operates on the principle of passing current through a portion of the rail as the car moves along the track to establish an electromagnetic field surrounding the rail and then detecting variations in said field caused by the presence of flaws by induction means which generates an E. M. F. Said E. M. F. after being suitably amplified may be caused to operate indicating means which includes a recorder in the car and means for spraying paint on the rail in the region of flaw.

It is the principal object of this invention to provide a method of testing the rails which, while utilizing the principle of the Sperry rail flaw detector car, will enable more efficient testing to be performed at a much more rapid rate than has heretofore been possible. This is accomplished without substantial increase in the cost of the necessary equipment. For this purpose I provide a testing method utilizing multiple cooperative testing elements in place of the single unit heretofore employed, the multiple elements having a common synchronized member.

Further objects and advantages of this invention will become apparent from the following detailed description thereof.

In the accompanying drawings,

Fig. 1 is a side assembly view showing the mechanism embodying the method of testing constituting this invention.

Fig. 5 is a portion of track showing the two types of paint marks.

Fig. 7 is a side elevation and wiring diagram illustrating a form of signaling means.

Fig. 8 is a detail of the chart driving means of Fig. 7.

Figure 3:
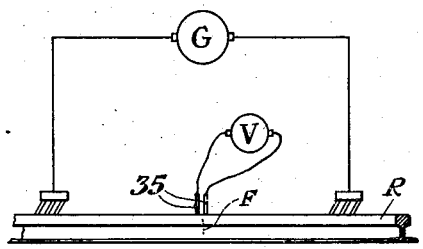
Fig. 3 is a diagrammatic view illustrating the principle embodied in the hand-testing of portions of rail indicated as defective by the Fig. 2 device.

The method of detection employed in the Sperry rail flaw detector car consists in providing a car body 10 adapted to ride on the rails on wheels 14, within which car body there is mounted a generator G adapted to supply current to the rails by means of sets of brushes 11 and 12 mounted on a current brush carriage 15. Said carriage is normally held in elevated ineffective position by means such as retractile springs (not shown) and cables 16, but may be lowered to effective position by any suitable means such as a leverage connection or by means of compressed fluid supplied to cylinders 17 to depress piston rods 18 connected to the current brush carriage 15. Said carriage when in engagement with the rail may ride along said rail on wheels 19.

The current sent through the rails by sets of brushes 11 and 12 will establish an electromagnetic field surrounding the same and said field will be uniform along the rail except in the region of flaw. Such non-uniformity in the electromagnetic field may be detected by means such as induction coils 20 mounted within a housing 21 supported on a detector carriage 22, adapted to be supported on the rail R by means such as wheels 23. Said detector carriage 22 may be mounted on the current brush carriage by means such as loosely fitting bolts and springs. The coils normally cut a constant number of lines of force but on entering and leaving the region of flaw, first one and then the other of said coils will cut a different number of lines of force, thus generating an E. M. F. which after being suitably amplified by amplifier A may be caused to operate indicating means. Said indicating means may take the form of a pen P operating on a chart C within the recording compartment of car 10 and may also operate a paint gun 30 to spray paint on the rail in the region of flaw as shown at 31. Said pen may be actuated by a relay 29 and said paint gun may be actuated by a relay 30' in the output of amplifier A. The chart C may be driven from the axle by any suitable gearing which gives the chart a definite relationship to the rails traversed. Said gearing may comprise a belt drive 51 between the axle 52 of one of the car wheels and a shaft 53 which is geared by belt 54 to the shaft 55 of the chart winding roller which then draws the chart C off the supply roll 56. Variations in the current supply to the rail, while causing a variation in the electromagnetic field surrounding the rail, will not result in operation of the indicating means because said coils 20 are of equal inductive effect and are oppositely connected so that a variation in current supply or movement of the coils toward or away from the rail R will not induce an E. M. F. since said coils are equally, oppositely and simultaneously affected thereby.

For better contact, water is sprayed upon the rail in advance of the current brushes 11 by means of a spout 27 supplied with water from tanks. The water and compressed air tanks T, T', T'' are shown mounted on the roof of the car 10.

Figure 2:
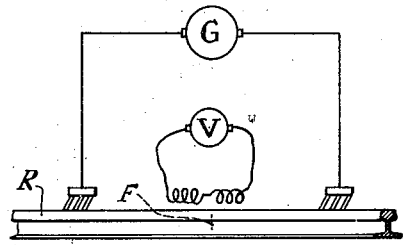
Fig. 2 is a diagrammatic view illustrating the principle of flaw detection embodied in the Sperry rail flaw detector.

The method of operation calls for operating the car at constant speed until a flaw is indicated by the indicating means. The car is driven by a driver while an operator sits at the rear at a recording table L together with an assistant operator and watches the various recording instruments as well as the indications as they appear on the record tape corresponding to both rails, and at the same time watches the surfaces of both rails. When a flaw is indicated on the chart and by a paint mark on the rail, said indication appears on the chart while the car is well over the rail, and the operator, seeing the indication on the chart, watches for the rail as it appears from under the car, selects the rail, aided by the said paint mark, and watches closely from the rear of the car. He thus obtains a long range view of the portion of the rail adjacent the paint mark and if in such long range view the operator is able to recognize that such mark is merely a surface indication, then he marks the record "S. I." (surface indication) and there is no interruption of movement. However, if the operator is confused by several indications, or if he is not certain as to the rail, the car is stopped, its movement is reversed, and it backs up for a visual inspection of the marked rail. If the operator does not see a surface defect at the marked portion of the rail, a repeat run or check test is made over the defective region. While the car is backing up for a repeat run, the assistant operator gets out and examines the rail to see whether there is any external defect such as a burn, flat, shelly surface, flow, or similar outside defects which are not internal defects, since the latter are the only kind it is desired to detect. The assistant operator who is examining the rail may during his inspection observe certain external evidences of internal defects as in the case where the internal defect has reached the surface, that is to say, where the internal fissure has cracked out, or the surface of the rail has sagged due to the presence of a horizontal fissure. If the assistant operator has found no external defects, or external evidence of an internal defect, and the car in its repeat run over the defective portion of rail again indicates a defect, the car is stopped, backed up, and a hand test is made. Said hand test consists in cleaning with emery cloth the portion of the rail indicated as defective to remove surface dirt and scale, oiling the cleaned surface of the rail for smooth operation and better contact, making two cable contacts with the rail for sending a current through the defective portion, and then running a pair of potential contacts 35 along the rail through the region of indicated flaw so that the presence of an internal flaw such as flaw F indicated in dotted lines in Figs. 2 and 3, will cause a drop in potential between the two potential contacts which may be indicated on a suitable meter V or by a Wheatstone bridge arrangement. If an internal defect is detected by the potential contacts, the rail is marked defective for removal by the railroad, the record of rail, number, location, etc. is taken down, and then the operator and assistant operator take their hand-testing equipment back into the car and the car backs up once more for attaining the necessary testing speed and for the purpose of "tying-in" the record, and then resumes its travel along the tracks. It can thus be seen by reason of the above description that the detector car loses considerable time every time a flaw other than a surface defect is indicated. In actual operation many hundreds of check tests must be made by each car in the course of a week's operation.

Figure 9:
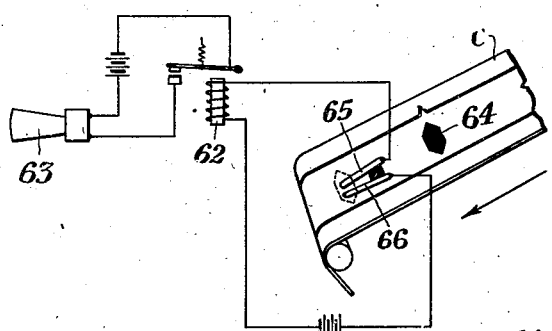
Fig. 9 is a view of a portion of the chart and a modified form of signaling means.

The Sperry rail flaw detector car described above is a complicated and expensive apparatus. It will be understood that the testing mechanism described with respect to the rail R is duplicated with respect to the other rail of the track, so that said car must carry either two generators G or else one generator with double windings to supply current to both rails. Said generators must be of large capacity and run continuously, thus greatly increasing the operating cost. The cylinders, pistons, current brush carriage, detector carriage, and delicate searching unit contained in housing 21 must all be duplicated on the other side. In addition there is provided expensive amplifying and recording mechanism in the recording compartment within the car, and complete propelling mechanism including engine, expensive reversing transmissions for frequent backing up for check tests and visual inspection, special brakes adapted for frequent stopping and starting. All the hereinbefore mentioned equipment results in high maintenance charges because of the severe service. Such a car requires the services of three men to operate. It will be appreciated that if a car of this type, involving a very large investment and the services of three men, could be operated so as to avoid the long delays that are incident to the verification of a defect, a much more economical operation would result. I have therefore provided a new method and a new arrangement of apparatus whereby the aforesaid expensive detector car may be caused to operate continuously without interruption (and consequent braking and reversing) for the purpose of verifying defects indicated on the record, so that the mileage which such car can traverse within a given period is by actual experience almost doubled. Not only am I enabled to obtain such vastly greater economy of operation due to almost doubling of the mileage tested, but by reason of the fact that the movement of the car is not interrupted I am enabled to obtain more accurate testing due to the constant speed of the car, which in an inductive method of testing is exceedingly important. Accuracy is also increased due to elimination of "tie-ins" and consequent elimination of risk of failure to test certain parts of a track. Also, I substitute close-range inspection of all rail defects in place of the long-range visual inspection hereinbefore described. The method and the apparatus which I employ to obtain these most desirable results are as follows:

Instead of providing but a single unit for testing, which unit not only indicates the defective portions of the rail but carries the main apparatus for investigating and determining the exact location, the nature, and the magnitude of the flaw, I provide a multiple cooperative testing system. The first element of such a system is a testing device for indicating the approximate location of defects. The second element of said system is provided with means for determining the exact position, nature and magnitude of the defects, and, therefore, unlike the first element, the second element is of very simple, light, inexpensive construction. After the test-run by car 10, which constitutes the first element of the system, has been completed, the chart C which is in the form of a roll is rewound and then is mounted in car 10' which constitutes the second element of the system, upon a supply roller 79 from which it is led to a winding roller 78 after it has passed over a table. The drive for feeding said chart extension from the axle of car 10' by any suitable driving connection 70 to 77 from an auxiliary wheel 85 to a winding roller to cause the chart to be wound on roll 78 and unwound from supply roll 79. Said drive includes variable speed driving connection, which in this case is shown as a pair of opposed cone pulleys 57 and 58 interconnected by belt 59. The purpose which the variable speed drive serves is to permit the chart to be fed along in synchronism with the rail that is passed over so that each mark on the chart will appear when the corresponding mark on the rail has been reached. When an indication of a flaw appears on the chart, the operator drives the car 10' up to the mark on the rail and then proceeds to investigate the said mark in the manner hereinafter described. In order to facilitate the operation of the car 10' the operator is apprised of the approach of a defect indication on the chart by a suitable signalling means which may take either of the forms shown in Figs. 7 and 8 and 9. In accordance with the form shown in Fig. 7, the operator of car 10 stamps a heavy opaque mark on the chart opposite an indication he does not find by observation to be a surface indication. Said mark is placed in a definite region of said chart, and cooperating with said region at a point preferably below the table is a photo electric cell 60 and a light source 61 whose light is normally not substantially interfered with by the passage of the tape between the source of light and the cell; but when one of the heavy black indicating marks made by the operator of car 10 on chart C passes between said light source and cell, the light is cut off and the cell is caused to operate a relay 62 to sound a horn 63 or operate any other suitable signal such as a light. In the Fig. 9 modification, the mark 64 placed on the chart by the operator of car 10 is of heavy graphite material and a pair of contact fingers 65, 66 normally engage the chart in the region of said mark so that when such mark appears beneath said fingers it closes the circuit between said fingers, since the graphite is a conductor.

The second element carries contacts adapted to be clamped to the rail and a generator G' for supplying current to the rail for making a hand-test; but since current is supplied to stationary contacts rather than to moving brushes, only one rail is hand-tested at a time, and since the generator operates only when a hand test is made, this generator is of much simpler design and construction than generator G having two windings, or two generators G whichever is employed. In actual practice this generator takes only one-sixth the amperage of generator G. Nor does this car carry the expensive detecting equipment carried by the detector carriage 22, the current brush carriage 15, or the raising and lowering mechanism. Neither is there the expensive recording apparatus with the amplifier system and the pen system utilized in car 10. Since the car is of very light construction, the self-propelling mechanism may be of very simple and inexpensive construction. The only mechanism in addition to generator G', the chart and the driving mechanism therefor, consists in a pair of hand clamps 40, 41 connected to the generator and adapted to be clamped to the rail on either side of the defective region, and a unit 42 containing the contacts 35 connected to the meter V. In actual practice, therefore, it has been found that car 10' represents an investment of about one-tenth that of car 10 and requires the services of only one or at most two men while permitting car 10 to operate with only two men, instead of three, by relieving car 10 of the duty of visual inspection.

The method of operation which I am enabled to effect by means of my multiple cooperative testing apparatus is therefore as follows: I provide one element, car 10, which is designed to travel along the rails at a constant speed continuously and without interruption during the testing operation. By testing operation is meant all the time that the car is on the tracks and engaged in detecting flaws. Said car as it runs along continuously at a constant speed gives an approximate indication, by means of the paint mark 31, of the location of a defective region. I then provide the second element, car 10', which travels along the rails at any desired speed between indications for the purpose of investigating the nature, the exact location, and the magnitude of the defect. Thus, for instance, while car 10 operates along the rails at a steady speed of, say, 7 miles per hour, making a continuous paper record and marking the approximate location of defective portions by means of paint marks 31, the car 10' travels from one paint mark to the next at its maximum speed of, say, 35 to 40 miles an hour, if necessary or desirable, slowing down at each signal from horn 63 indicating the approach of the next paint mark, and, if the operator sees that the paint mark was not caused by a surface deflect, he stops and gets out to examine the rail for surface defects, such conditions as "shelly" portions which would be the cause of such an indication but which are not internal defects, and for surface characteristics of internal defects. If he can find no such surface defect or characteristic, then he takes out his hand-testing equipment which consists of the clamps 40 and 41 which he clamps to the rail at either side of the defective portion, cleans the rail with emery cloth, oils the rail surface and runs his contacts 35 over the defective portion. If the meter V indicates by a deviation the presence of a flaw, he marks the exact location of said flaw for later identification by railway track forces in connection with rail removal and so that the rail may be broken at that point for the purpose of verifying the defect. The degree of deviation of the needle of meter V gives him an indication of the magnitude of the flaw. Thus, the function of the car 10', travelling at any desired speed along the rail between indications, is to inspect visually at close range each defect, to investigate the nature of the defect, located it exactly, determine its magnitude, properly mark the defect for identification and make necessary record of all rails with internal defects.

By the above described method of and apparatus for testing, I remedy one great defect that was heretofore inherent in rail flaw detection. Heretofore, as previously described, an operator sat at table L at the rear of car 10 and watched for the paint mark to come out from under the car. By the time he saw the paint mark said mark was a considerable distance away from him and moving further away very rapidly. That is to say, if the car is travelling seven miles per hour the paint mark is moving away at the rate of 10½ feet per second. This cuts down to a very small interval the time available for the operator to make his long range inspection of the portion of rail indicated by the paint mark. In other words, with each passing second his chances for properly inspecting the marked portion of the rail diminish.

Figure 4:
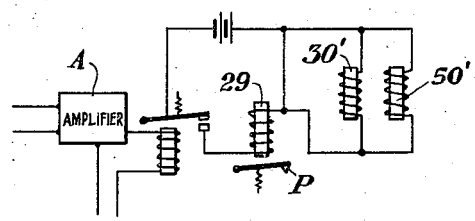
Fig. 4 is a wiring diagram showing the means for energizing the various relays.

With the multiple cooperative method of testing, however, the operator at table L is not required to make the inspection of the rail. This inspection is made by the operator seated upon bench 43 at the front end of the second unit. Instead of the paint mark receding from the operator on said bench 43 with each passing second, we find that the mark is actually approaching the operator, and his inspection is improved with each passing second until he is close to the mark. In other words, his eye catches the mark a considerable distance away and then becomes better and better focused upon the portion of rail indicated with each passing second, so that he can readily note surface defects. In order to facilitate the operator's picking up the marked portion of the rail after the sounding of the signal by horn 63, I may provide in addition to the paint gun 30 of relatively small capacity which makes a small paint mark 31 (see Fig. 5) on the gauge side of the rail, a paint gun 50 of relatively large capacity situated somewhat in advance of paint gun 30. Both paint guns 30 and 50 are actuated from the output of amplifier A at the same time, as shown in Fig. 4, the paint gun 50 being operated by relay 50' in parallel with relay 30' which operates paint gun 30. As a result of this construction, paint gun 50 makes a large paint mark, shown at 51, on the road-bed in the center of the track and covering several ties so that it can be seen at a much greater distance than the paint mark 31. The paint gun 50 is caused to operate whenever the paint gun 30 at either side of the track is actuated. As a result of this construction the operator can see the large paint mark 51 at a considerable distance and can then immediately focus his attention upon that portion of the rail. It will facilitate his picking up the small paint marks 31 and enable him to focus his view upon the small paint marks sooner than would otherwise be the case. Also, it enables the second car 10' to be driven at higher speeds between indications because there is then no longer any danger of missing the small paint mark 31.

Figure 6:
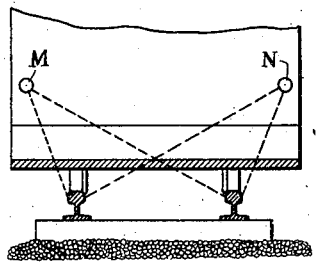
Fig. 6 is an end view showing the relation to the tracks of the second element of the testing apparatus.

It will be seen that the operator's seat 43 on car 10' is positioned low and closely adjacent the rails, and permits a much better inspection than was possible by an operator seated at table L in car 10 relatively high above the rail surface. Not only can the operator on seat 43 make a better inspection of the surface, but by reason of the fact that the car overhangs the rail and the operator's seat is closely adjacent the rails, as shown in Fig. 6, two men who operate this car, seated at each side of the car, can make a thorough inspection of both sides of the rail. Thus, operator M can inspect the outside of one rail and the gauge of the other rail, while operator N can inspect the gauge of the first rail and the outside of the other rail. This is extremely important because when such conditions of track are met as flowed rail, that is, where the upper surface of the rail overhangs the side, it has heretofore been impossible to see whether there was a horizontal cracked out fissure underlying the overhanging part or not, because the operator sat relatively high above the track and could not see the outside surfaces of the rails.

Since the increased mileage which may be covered by the expensive car 10 is almost doubled in the course of a testing day and more accurate testing results from close-range inspection by car 10', and since the cost of operation of inexpensive car 10' having the apparatus and functions described is only a small fraction of the cost of operation of car 10, it will be seen that a far more economical method of testing is thus evolved by means of my multiple elements operating on different principles and performing different functions, that is to say, one element being designed to operate at constant speed to indicate flaws approximately, while the other element is designed to operate at any desired speed between indications but cooperating with the first element in determining the exact location, nature and magnitude of defects.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is:

1. The method of detecting flaws in rails in track by means of flaw responsive mechanisms, which consists in operating a car carrying a flaw responsive mechanism along the rails, operating a moving chart on the car in predetermined speed relationship to the movement of the car, indicating by means of the flaw responsive mechanism the presence of a flaw in the rail by a mark upon the chart and an additional mark upon the rail in the region of the flaw, transferring the chart to a second car, operating the second car along the rails, moving the chart in relationship to the movement of the second car, adjusting the last-named relationship to synchronize the indications on the chart with the corresponding indications on the rail, and investigating by a second flaw responsive mechanism the points indicated as defective.

2. The method of detecting flaws in rails in track by means of flaw responsive mechanisms, which consists in operating a car carrying a flaw responsive mechanism along the rails at a constant speed, operating a moving chart on the car in predetermined speed relationship to the movement of the car, indicating by means of the flaw responsive mechanism the presence of a flaw in the rail by a mark upon the chart and an additional mark upon the rail in the region of the flaw, transferring the chart to a second car, operating the second car along the rails at any desired speed between regions of flaw, moving the chart in relationship to the movement of the second car, adjusting the last-named relationship to synchronize the indications on the chart with the corresponding indications on the rail, and investigating by a second flaw responsive mechanism the points indicated as defective.

3. The method of detecting flaws in rails in track by means of flaw responsive mechanisms, which consists in operating a car carrying a flaw responsive mechanism along the rails continuously at a constant speed, operating a moving chart on the car in predetermined speed relationship to the movement of the car, indicating by means of the flaw responsive mechanism the presence of a flaw in the rail by a mark upon the chart and an additional mark upon the rail in the region of the flaw, transferring the chart to a second car, operating the second car along the rails at any desired speed between regions of flaw, moving the chart in relationship to the movement of the second car, adjusting the last-named relationship to synchronize the indications on the chart with the corresponding indications on the rail, stopping the second car at each indication, and investigating by a second flaw responsive mechanism the points indicated as defective.

4. A flaw detector for rails in track comprising multiple co-operating elements, one of said elements having flaw responsive means, means for operating said element along the rails, a chart, driving means whereby the movement of said element drives said chart in predetermined speed relationship to the movement of said element, means actuated by said flaw responsive means for placing a mark on said chart, means actuated by said flaw responsive means for placing a mark upon the rail in the region of flaw, said chart being adapted to be transferred to a second of said elements, means for operating said second element along the rails, driving means whereby the movement of said second element drives said chart is predetermined speed relationship to the movement of said second element, said driving means including adjustable means for synchronizing the indications on the charts with the indications on the rail, and a second flaw responsive means carried by the second element for investigating the points indicated as defective.

5. A flaw detector for rails in track comprising multiple co-operating elements, one of said elements having flaw responsive means, means for operating said element along the rails, a chart, driving means whereby the movement of said element drives said chart in predetermined speed relationship to the movement of said element, means actuated by said flaw responsive means for placing a mark on said chart, said chart being adapted to be transferred to a second of said elements, means for operating said second element along the rails, driving means whereby the movement of said second element drives said chart in predetermined relationship to the movement of said second element, said driving means including adjustable means for giving the same movement of the chart relative to the rail on the second element as on the first element, and a second flaw responsive means carried by the second element for investigating the points indicated as defective.

HARCOURT C. DRAKE.